United States Patent [19]
Conners et al.

[11] Patent Number: 5,283,707
[45] Date of Patent: Feb. 1, 1994

[54] INRUSH CURRENT LIMITING CIRCUIT

[75] Inventors: Christopher R. Conners, Nepean; Manfred K. Ficker, Kanata, both of Canada

[73] Assignee: Northern Telecom Limited, Montreal, Canada

[21] Appl. No.: 982,536

[22] Filed: Nov. 27, 1992

[51] Int. Cl.$^5$ .............................................. H02H 9/00
[52] U.S. Cl. ...................................... 361/58; 323/908
[58] Field of Search ............... 323/299, 901, 908, 269; 361/58

[56] References Cited

U.S. PATENT DOCUMENTS

| | | | |
|---|---|---|---|
| 4,908,489 | 3/1990 | Panecki et al. | 323/901 |
| 5,010,293 | 4/1991 | Ellersick | 323/278 |
| 5,079,455 | 1/1992 | McCafferty et al. | 307/568 |
| 5,155,648 | 10/1992 | Gauthier | 361/58 |

OTHER PUBLICATIONS

"Slow Start Circuit," IBM Tech. Discl. Bul., vol. 32, No. 5B, pp. 407, 408, Oct. 1989.

Primary Examiner—William H. Beha, Jr.
Attorney, Agent, or Firm—Dallas F. Smith

[57] ABSTRACT

An inrush current limiting circuit includes a power FET switch connected between power source and load and a control circuit. The power FET switch includes one or more parallel-connected power FETs, each having low individual conductive resistances. The control circuit, connected between the power inputs and the gate of power FET switch, includes a voltage supply for providing sufficient voltage to turn the power FET switch on and a time constant circuit for controlling the rate at which the power FET means is turned on. With the voltage supply connected to an optional enable terminal, a DC enable signal can control powering of the load. A second time constant circuit controls the rate of power down.

16 Claims, 2 Drawing Sheets

INRUSH CURRENT LIMITING CIRCUIT

This invention relates to current limiting circuits and is particularly concerned with limiting inrush current for circuit packs when connected to a high current capacity DC distribution bus.

BACKGROUND OF THE INVENTION

In systems, such as telecommunications systems, it is often necessary to exchange circuit packs or cards while the remaining circuit packs or cards are in an operating state. When inserting a circuit pack there is no mechanical way to control how many backplane power pins make initial contact. For a 5 volt supply and a circuit pack requiring 60 Watts of power, an estimated instantaneous current can reach well over 75 A. If only a single power pin makes contact for as short a period as one millisecond, the pin would be damaged. A further concern is that the loading/unloading of the power supply, by insertion/withdrawal of the circuit pack, may exceed the regulating capability of the supply, thus effecting the operation of other circuit packs.

In U.S. Pat. No. 5,010,293, issued Apr. 23, 1991, William F. Ellersick teaches an inrush current limiting circuit for use in telecommunication systems. The problem solved is limiting inrush current when a −48 V to +5 V DC/DC power converter is plugged into a shelf powered by a −48 V power distribution bus. The circuit taught is not suitable for a +5 V power distribution bus.

SUMMARY OF THE INVENTION

An object of the present invention is to provide an improved inrush current limiting circuit.

In accordance with the present invention there is provided in an inrush current limiting circuit, comprising input terminals for connection to a power supply output and a reference potential, output terminals for connection to a load, power FET means having a control electrode and a conductive controlled path which is connected between the power input terminal and a respective one of the output terminals, voltage supply means connected to the input terminals and having an output for providing sufficient voltage to render the power FET means conductive, first time constant means coupled between the voltage supply means and the control electrode for controlling the rate at which the power FET means is rendered conductive in accordance with a first predetermined time constant, and second time constant means coupled between the control electrode and the reference potential input for controlling the rate at which the power FET means is rendered nonconductive in accordance with a second predetermined time constant.

In accordance with another aspect of the present invention there is provided an inrush current limiting circuit, comprising input terminals for connection to a power supply output and a reference potential, output terminals for connection to a load, an enable terminal for receiving an enable signal, power FET means having a control electrode and a conductive controlled path which is connected between the power input terminal and a respective one of the output terminals, voltage supply means, connected to the enable terminal and the reference potential input terminal, and having an output for providing sufficient voltage to render the power FET means conductive, first time constant means coupled between the voltage supply means and the control electrode for controlling the rate at which the power FET means is rendered conductive in accordance with a first predetermined time constant, and second time constant means coupled between the voltage supply means and the control electrode for rendering the power FET means nonconductive in accordance with a second predetermined time constant.

In accordance with a further aspect of the present invention there is provided an arrangement including a backplane having at least two conductors, a power supply connected to the conductors, and a plurality of circuit cards attached to the backplane and connected to the conductors, each of the plurality of circuit cards including an inrush current limiting circuit comprising input terminals for connection to the power supply output and a reference potential, output terminals for connection to the load, power FET means having a control electrode and a conductive controlled path which is connected between the power input terminal and a respective one of the output terminals, voltage supply means connected to the input terminals and having an output for providing sufficient voltage to render the power FET means conductive, and time constant means coupled between the voltage supply means and the control electrode for controlling the rate at which the power FET means is rendered conductive in accordance with a predetermined time constant.

An advantage of the present invention is limiting of inrush current by providing a relatively long power-up time constant and by providing a relatively short power-down time constant. Further advantages include adaptability to circuit packs using 3 Volt technology. An embodiment of the present invention may be microprocessor controlled for enabling, that is power-up, and disabling, that is power-down.

BRIEF DESCRIPTION OF THE DRAWINGS

The present invention will be further understood from the following description with reference to the drawings in which.

Similar references are used in different figures to denote similar components.

DETAILED DESCRIPTION

Figure 1:
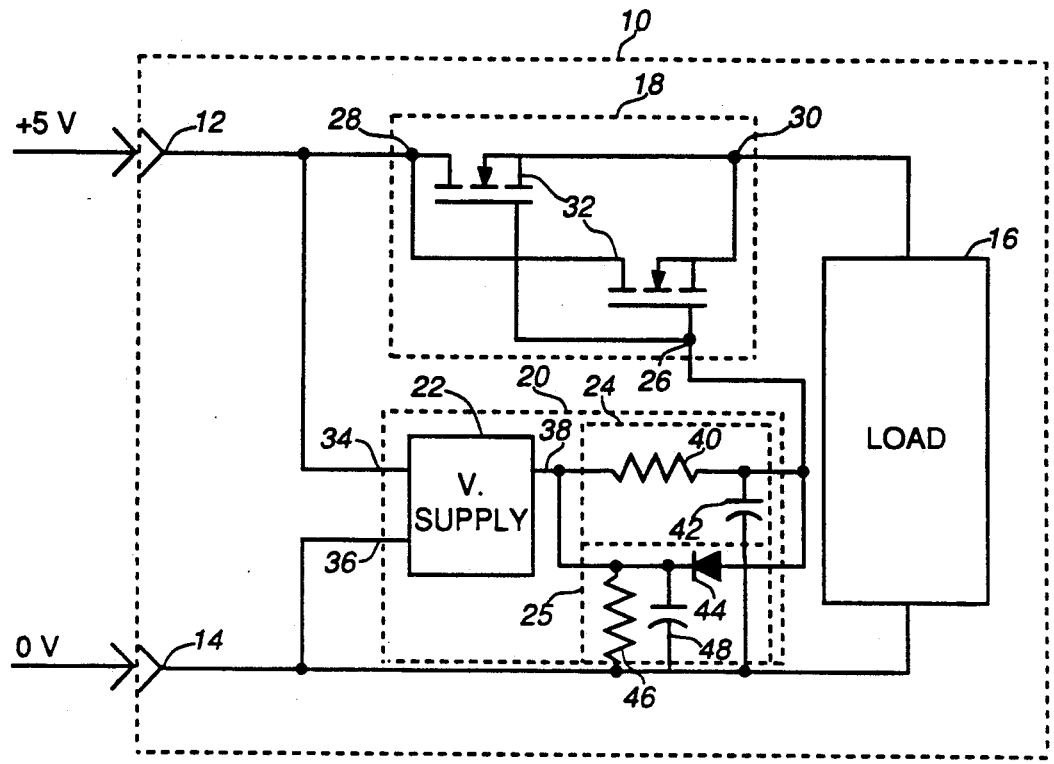
FIG. 1 illustrates, in a block diagram, an inrush current limiting circuit in accordance with a first embodiment of the present invention.

Referring to FIG. 1, there is illustrated, in block diagram form, an inrush current limiting circuit in accordance with a first embodiment of the present invention. A circuit card 10 has input connectors 12 and 14 for connection of its load 16 to a power supply. An inrush current limiting circuit connected between the input 12 and the load 16 includes a FET switch 18, connected between the input connector 12 and the load 16, and a control circuit 20, connected to the input connectors 12 and 14 and the FET switch 18. The control circuit 20 includes a voltage supply 22, a power-up time constant circuit 24, and a power-down time constant circuit 25.

The FET switch 18 has a control electrode 26 and a conductive controlled path between terminals 28 and 30. The terminal 28 is connected to the 5 V power input 12 and the terminal 30 is connected to the load 16. The FET switch 18 is connected to the control circuit 20 via the control electrode 26. The FET switch 18 includes two parallel-connected N-Channel MOSFET transistors 32, having high current rating and very low individual ON resistance (typically 0.030 ohms). Examples of suitable power MOSFETs are MPT50N05EL by Motorola and IRLZ44 by International Rectifier.

The voltage supply 22 of control circuit 20 has inputs connected to the input connectors 12 and 14 via conductors 34 and 36, respectively, and an output connected to the power-up time constant circuit 24 via a conductor 38.

The power-up time constant circuit 24 includes an RC network having a resistor 40 and a capacitor 42. The resistor 40 connects the conductor 38 to the control electrode 26. The capacitor 42 couples the control electrode to the reference potential.

The power-down time constant circuit 25 includes a diode 44 and an RC network having, connected in parallel, a resistor 46 and a capacitor 48. The diode 44 is connected in parallel with the resistor 40, its anode to the control electrode and its cathode to the reference potential via the parallel RC network of resistor 46 and capacitor 48. In order to provide a desired, relatively short, power-down time constant, the capacitor 48 may be omitted, in which case the power-down time constant relies upon the capacitance of the voltage supply.

In operation, when the circuit card 10 is first plugged into power supply input 12 and ground 14, the FET switch 18 conductive controlled path between terminals 28 and 30 is in a high impedance state. The voltage supply 22 is turned on and provides an output voltage of between approximately 10 and 12 V to the power-up time constant circuit 24. The values of the resistor 40 and the capacitor 42 of the RC network in power-up time constant circuit 24 controls the rate of change of the voltage applied to the control electrode 26 of FET switch 18, and thereby the current flow and rate of supply loading. Thus, inrush current is controlled. As an additional benefit, loading of the power supply is also controlled.

When the circuit card 10 is removed, the diode 44 discharges the control electrode 26 in accordance with the time constant of the RC network of resistor 46 and capacitor 48. This ensures the effectiveness of the inrush current limiting circuit when, for example, a circuit pack is removed and almost immediately reinserted.

Figure 2:
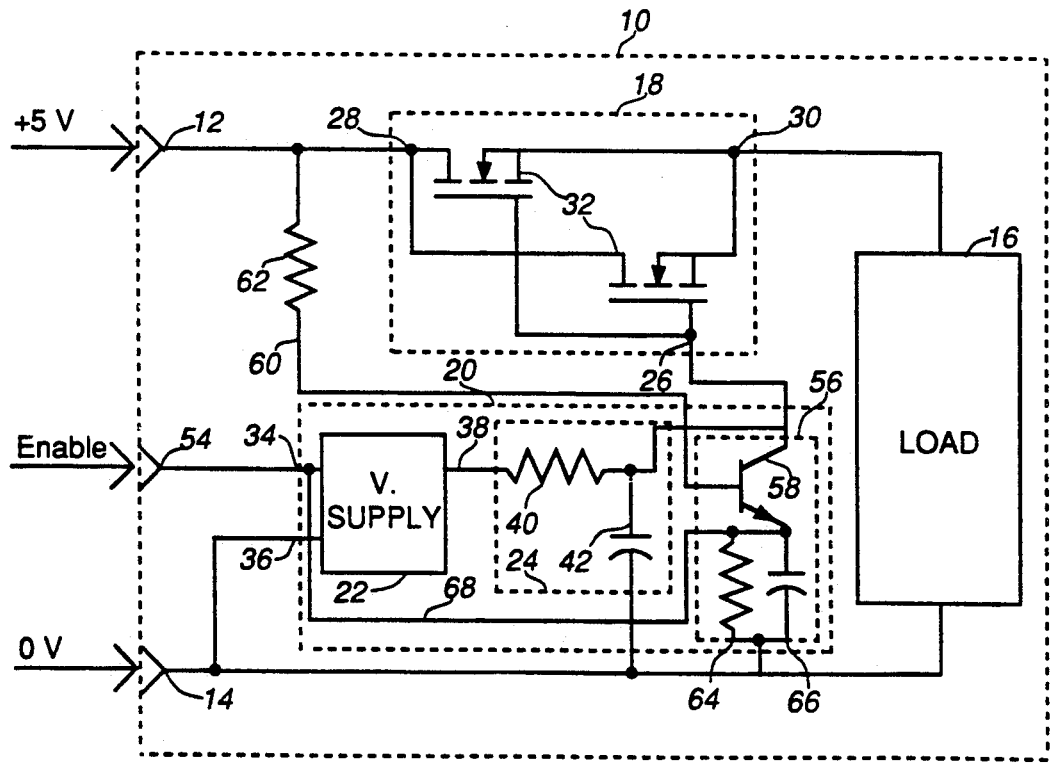
FIG. 2 illustrates, in a block diagram, an inrush current limiting circuit in accordance with a second embodiment of the present invention.

Referring to FIG. 2, there is illustrated, in block diagram form, an inrush current limiting circuit in accordance with a second embodiment of the present invention. The second embodiment includes an enable input 54 for receiving and enabling signal and a power-down time constant circuit 56. The voltage supply 22 is connected to the enable input 54 rather than the power supply input 12.

The power-down time constant circuit 56 includes an NPN transistor 58, connected to the input connector 12 via a conductor 60 and a biasing resistor 62, and an RC network having a resistor 64 and a capacitor 66 parallel connected between the transistor 58, at its emitter, and the reference potential connector 14. The RC network is connected via a conductor 68 to the voltage supply input conductor 34.

In operation, when the circuit card 10 is first plugged into power supply input 12 and ground 14, the FET switch 18 conductive controlled path between terminals 28 and 30 is in a high impedance state. The terminal 28 is at +5 V, but the control electrode 26 is held discharged at ground potential by the forward biassed NPN transistor 58 of power-down time constant circuit 56.

When an enable signal comprising a DC voltage, approximately equal to or less than 0.5 VDC below the level of the power supply input, is applied to the enable input 54, the voltage supply 22 is turned on and provides an output voltage of between approximately 10 and 12 V to the power-up time constant circuit 24. The power-up operation proceeds as in the embodiment of FIG. 1.

When the enable input voltage is removed from the enable input 54, the NPN transistor 58 of power-down time constant circuit 56 is forward biassed, and the RC network, formed by the resistor 64 and the capacitor 66, discharges the control electrode 26 of FET switch 18, thereby controlling the rate of power supply unloading.

The voltage supply 22 includes a suitable signal source such as an astable multivibrator having an output of approximately 2 to 4 V, depending upon the input voltage, but may be any signal source capable of providing a sine wave or square wave signal. The voltage supply 22 also includes a DC rectifier and voltage multiplier having an approximate output voltage of 10-12 V referenced to ground potential. Any voltage supply capable of providing sufficient voltage to fully turn on the FET switch 18 is acceptable.

For the power-up time constant circuit 24, values for the RC network provide a time constant in the range of 10 to 100 ms, for the embodiments of FIGS. 1 and 2, depending upon the load of the circuit pack. For the embodiment of FIG. 1, the power-down time constant circuit 25 values for the RC network provide a time constant in the range of 1 to 10 ms, depending upon the load of the circuit pack. For the embodiment of FIG. 2, the power-down time constant circuit 46 values for the RC network provide a time constant in the range of 1 to 10 ms.

Figure 3:
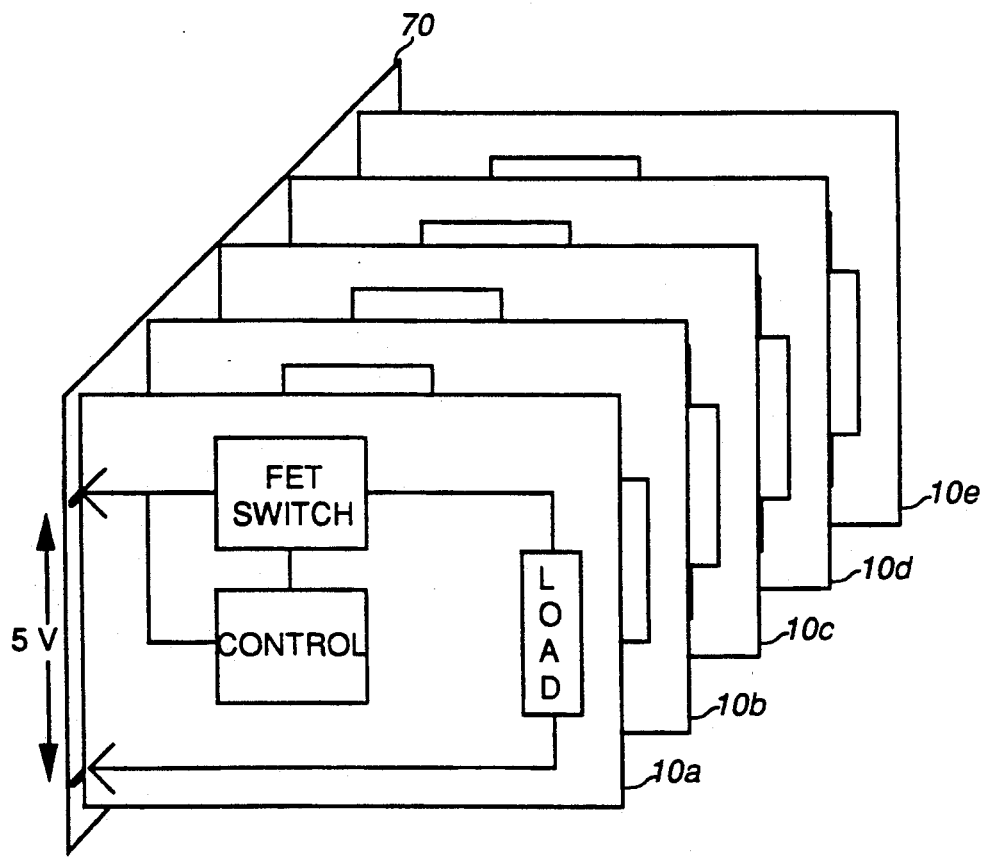
FIG. 3 illustrates a plurality of circuits, each including the circuit of FIG. 2, connected to a backplane.

Referring to FIG. 3, there is illustrated a plurality of circuits, each including the circuit of FIG. 1, connected to a backplane. Each circuit card 10a through 10e is edge connected to a backplane 70 to receive power and to exchange signals in known manner. Each circuit card 10 includes the inrush current limiting circuit illustrated in FIG. 1.

Numerous modifications, variations and adaptations may be made to the particular embodiments of the invention described above without departing from the scope of the invention, which is defined in the claims.

What is claimed is:

1. An inrush current limiting circuit, comprising:
input terminals for connection to a power supply output and a reference potential;
output terminals for connection to a load;
power FET means having a control electrode and a conductive controlled path which is connected between the power input terminal and a respective one of the output terminals;
voltage supply means connected to the input terminals and having an output for providing sufficient voltage to render the power FET means conductive;
first time constant means coupled between the voltage supply means and the control electrode for controlling the rate at which the power FET means is rendered conductive in accordance with a first predetermined time constant; and second time constant means coupled between the control electrode and the reference potential input for controlling the rate at which the power FET means is rendered nonconductive in accordance with a second predetermined time constant.

2. A circuit as claimed in claim 1 wherein the first time constant means comprises a resistor connected between the voltage supply means and the control electrode and a capacitor connected between the control electrode and the reference potential.

3. A circuit as claimed in claim 2 wherein the first time constant has a range of between about 10 ms to about 100 ms.

4. A circuit as claimed in claim 1 wherein the second time constant means includes a diode, connected in parallel with the resistor of the first time constant means, having an anode connected to the control electrode and a cathode connected to the voltage supply means, and a resistor and a capacitor parallel connected between the anode and the reference potential input terminal.

5. A circuit as claimed in claim 4 wherein the second time constant has a range of between about 1 ms to about 10 ms.

6. A circuit as claimed in claim 1 wherein the power FET means includes at least one power FET.

7. A circuit as claimed in claim 1 wherein the power FET means includes two parallel-connected power FETs.

8. An inrush current limiting circuit, comprising:
input terminals for connection to a power supply output and a reference potential;
output terminals for connection to a load;
an enable terminal for receiving an enable signal;
power FET means having a control electrode and a conductive controlled path which is connected between the power input terminal and a respective one of the output terminals;
voltage supply means, connected to the enable terminal and the reference potential input terminal, and having an output for providing sufficient voltage to render the power FET means conductive;
first time constant means coupled between the voltage supply means and the control electrode for controlling the rate at which the power FET means is rendered conductive in accordance with a predetermined time constant; and
second time constant means coupled between the voltage supply means and the control electrode for rendering the power FET means non-conductive in accordance with a second predetermined time constant.

9. A circuit as claimed in claim 8 wherein the first time constant means comprises a resistor connected between the voltage supply means and the control electrode and a capacitor connected between the control electrode and the reference potential.

10. A circuit as claimed in claim 9 wherein the first time constant has a range of between about 10 ms to about 100 ms.

11. A circuit as claimed in claim 8 wherein the second time constant means includes an NPN transistor having a collector connected to the control electrode, a base coupled to the power supply input terminal, and an emitter connected to the enable terminal and a resistor and capacitor parallel connected between the emitter and the reference potential input terminal.

12. A circuit as claimed in claim 11 wherein the second time constant has a range of between about 1 ms to about 10 ms.

13. A circuit as claimed in claim 8 wherein the time power FET means includes at least one power FET.

14. A circuit as claimed in claim 8 wherein the power FET means includes two parallel-connected power FETs.

15. An arrangement including a backplane having at least two conductors, a power supply connected to the conductors, and a plurality of circuit cards attached to the backplane and connected to the conductors, each of the plurality of circuit cards including an inrush current limiting circuit comprising:
input terminals for connection to the power supply output and a reference potential;
output terminals for connection to the load;
power FET means having a control electrode and a conductive controlled path which is connected between the power input terminal and a respective one of the output terminals;
voltage supply means connected to the input terminals and having an output for providing sufficient voltage to render the power FET means conductive; and
time constant means coupled between the voltage supply means and the control electrode for controlling the rate at which the power FET means is rendered conductive in accordance with a predetermined time constant.

16. A circuit as claimed in claim 15 further comprising an enable terminal for receiving an enable signal and wherein the voltage supply means is connected to the enable terminal and the reference potential input terminal and is responsive to the enable signal for providing sufficient voltage to render the power FET means conductive.

* * * * *